US010789361B2

(12) United States Patent
Breiman et al.

(10) Patent No.: US 10,789,361 B2
(45) Date of Patent: Sep. 29, 2020

(54) RANSOMWARE ATTACK REMEDIATION (71) Applicant: Minerva Labs Ltd., Petach-Tikva (IL)

(72) Inventors: Erez Breiman, Tel-Aviv (IL); Eduard Bobritsky, Yahud-Monosson (IL); Omri Moyal, Nesher (IL); Gil Migdan, Ramat-Gan (IL); Denis Kamanovsky, Ramat-Gan (IL)

(73) Assignee: Minerva Labs Ltd., Petach-Tikva (IL)

( * ) Notice: Subject to any disclaimer, the term of this patent is extended or adjusted under 35 U.S.C. 154(b) by 183 days.

(21) Appl. No.: 15/746,461

(22) PCT Filed: Jan. 23, 2017

(86) PCT No.: PCT/IL2017/050085
§ 371 (c)(1),
(2) Date: Jan. 22, 2018

(87) PCT Pub. No.: WO2017/125935
PCT Pub. Date: Jul. 27, 2017

(65) Prior Publication Data
US 2018/0211038 A1 Jul. 26, 2018

Related U.S. Application Data (60) Provisional application No. 62/286,404, filed on Jan. 24, 2016.

(51) Int. Cl.
*G06F 21/00* (2013.01)
*G06F 21/56* (2013.01)
(Continued)

(52) U.S. Cl.
CPC ............ *G06F 21/565* (2013.01); *G06F 11/14* (2013.01); *G06F 11/1451* (2013.01);
(Continued)

(58) Field of Classification Search
CPC .. G06F 21/565; G06F 21/602; G06F 11/1451; G06F 2221/034; G06F 2201/84;
(Continued)

(56) References Cited

U.S. PATENT DOCUMENTS 9,317,686 B1 4/2016 Ye et al.
2010/0077165 A1* 3/2010 Lu ..................... G06F 11/1451
711/162
(Continued)

FOREIGN PATENT DOCUMENTS

WO WO 2017/125935 7/2017

OTHER PUBLICATIONS

International Search Report and the Written Opinion dated Apr. 20, 2017 From the International Searching Authority Re. Application No. PCT/IL2017/050085. (10 Pages).
(Continued)

*Primary Examiner* — Brandon S Hoffman
*Assistant Examiner* — William A Corum, Jr.

(57) ABSTRACT

A method for processing files as a preemptive measure against a ransomware activity. The method comprises scanning a plurality of file operation requests sent to an operating system (OS) executed on a computing device to detect a guarded file operation request that comprises instructions to process a file managed by a file system used by said OS, delaying an execution of said guarded file operation request, temporarily storing a copy of said file in a backup storage in response to said detection of said guarded file operation request, and stop delaying said execution of said guarded file operation request when said copy is stored in said backup storage.

24 Claims, 4 Drawing Sheets (51) Int. Cl.
  *G06F 11/14* (2006.01)
  *H04L 29/06* (2006.01)
  *G06F 21/60* (2013.01)

(52) U.S. Cl.
  CPC ............ *G06F 21/56* (2013.01); *G06F 21/564* (2013.01); *G06F 21/568* (2013.01); *G06F 21/602* (2013.01); *H04L 63/145* (2013.01); *G06F 2201/84* (2013.01); *G06F 2221/034* (2013.01); *G06F 2221/2107* (2013.01)

(58) Field of Classification Search
  CPC ........... G06F 2221/2107; G06F 21/568; G06F 21/564; G06F 21/56; G06F 11/14; H04L 63/145
  See application file for complete search history.

(56) References Cited

U.S. PATENT DOCUMENTS

| 2014/0310800 | A1 | 10/2014 | Kabra et al. |
| 2016/0378988 | A1* | 12/2016 | Bhashkar ............. G06F 21/566 726/24 |
| 2017/0076096 | A1* | 3/2017 | Challener ............. G06F 21/53 |
| 2017/0177867 | A1* | 6/2017 | Crofton ................. G06F 16/113 |
| 2019/0228153 | A1* | 7/2019 | Scaife .................. G06F 21/565 |

OTHER PUBLICATIONS

International Preliminary Report on Patentability dated Aug. 2, 2018 From the International Bureau of WIPO Re. Application No. PCT/IL2017/050085. (7 Pages).

Office Action dated Nov. 28, 2019 From the Israel Patent Office Re. Application No. 257213 and Its Translation Into English. (5 Pages).

* cited by examiner

RANSOMWARE ATTACK REMEDIATION

RELATED APPLICATIONS

This application is a National Phase of PCT Patent Application No. PCT/IL2017/050085 having International filing date of Jan. 23, 2017, which claims the benefit of priority under 35 USC § 119(e) of U.S. Provisional Patent Application No. 62/286,404 filed on Jan. 24, 2016. The contents of the above applications are all incorporated by reference as if fully set forth herein in their entirety.

FIELD AND BACKGROUND OF THE INVENTION

The present invention, in some embodiments thereof, relates to ransomware and, more specifically, but not exclusively, to methods and systems for remediating the effect of ransomware.

Ransomware is a type of malware that restricts access to the infected computer system in some way, and demands that the user pay a ransom to the malware operators to remove the restriction. Some forms of ransomware systematically encrypt files on the system's storage resources, which become difficult or impossible to decrypt without paying the ransom for the encryption key, while some may simply lock the system and display messages intended to coax the user into paying.

As with other forms of malware, security software might not detect a ransomware payload, or, especially in the case of encrypting payloads, only after encryption is underway or complete, particularly if a new version unknown to the protective software is distributed. If an attack is suspected or detected in its early stages, it takes some time for encryption to take place; immediate removal of the malware (a relatively simple process) before it has completed would stop further damage to data, without salvaging any already lost.

Security experts have suggested precautionary measures for dealing with ransomware. Using software or other security policies to block known payloads from launching will help to prevent infection, but will not protect against all attacks. Keeping backups of data stored in locations inaccessible to the infected computer—the malware may encrypt, for example, a USB or a network backup if it is connected to the computer will allow data to be restored to its state at backup time. Ransomware that makes the computer unusable without encrypting files can be overcome by those with sufficient expertise, or by some software for non-experts.

SUMMARY OF THE INVENTION

According to some embodiments of the present invention, there is provided a computerized method for processing files as a preemptive measure against a ransomware activity, comprising: scanning a plurality of file operation requests sent to an operating system (OS) executed on a computing device to detect a guarded file operation request that comprises instructions to process a file managed by a file system used by the OS, delaying an execution of the guarded file operation request, temporarily storing a copy of the file in a backup storage in response to the detection of the guarded file operation request, and stop delaying the execution of the guarded file operation request when the copy is stored in the backup storage.

Optionally, the copy is stored for a period defined according to an evaluation of a risk from at least one process submitting the guarded file operation request.

More optionally, the method further comprises scanning a plurality of additional file operation requests sent to the OS to detect a plurality of additional guarded file operation requests each comprises file processing instructions to process a plurality of other files managed by the file system. The risk is determined according to an analysis of at least one characteristic of the plurality of additional guarded file operation requests.

Optionally, the copy is stored for a period defined according to a number of previously detected guarded file operation requests from a common process, each one of the previously detected guarded file operation requests comprises file processing instructions to process a plurality of other files managed by the file system.

Optionally, the plurality of file operation requests are Application Program Interface (API) calls.

More optionally, the API calls are captured by hooking.

More optionally, the guarded file operation request is selected from a group consisting of: a NtSetInformationFile call, a DeleteFile call, a NtOpenFile call, a NtCreateFile call, and a ntWriteFile.

Optionally, the scanning is performed by a filter driver in kernel-mode of the OS.

More optionally, the method further comprises classifying a process submitting the guarded file operation request based on an analysis of a sequence that combines the guarded file operation request and a plurality of file operation requests previously submitted by the process to the OS during a predefined period.

More optionally, the method further comprises classifying a process submitting the guarded file operation request based on an analysis of a memory of the process to detect a presence or an absence of at least one predefined crypt related code section.

More optionally, the method further comprises classifying a process submitting the guarded file operation request based on an analysis of a file processing behavior pattern.

Optionally, the storing comprises: extracting metadata related to the file from a resource managed by the OS and logging the metadata.

Optionally, the storing comprises: identifying when not enough a storage space is found in the backup storage for storing the file, deleting at least one backed up copy stored in the backup storage according a backup date.

Optionally, the storing comprises: identifying when not enough a storage space is found in the backup storage for storing the file, and expending the backup storage using at least one network storage resource.

Optionally, the storing comprises: storing a timestamp indicative of a storage time of the file, identifying a plurality of previously backed up copies of the file in the backup storage, and using the timestamp for selecting which of the plurality of previously backed up copies to delete in order to release storage space in the backup storage.

Optionally, the storing comprises: identifying when not enough a storage space is found in the backup storage for storing the file, and preventing an execution of the guarded file operation request by the OS.

Optionally, the backup storage is a remote storage accessed by the computing device via a network.

More optionally, the method further comprises scanning a plurality of additional file operation requests sent to the OS to detect a plurality of additional guarded file operation requests each comprises file processing instructions to process a plurality of other files managed by the file system, calculating a frequency or an amount of the plurality of additional guarded file operation requests, and determining a presence or an absence of a ransomware activity according to the frequency or the amount.

More optionally, the method further comprises forwarding via network a notice about the presence or the absence to a central server.

According to some embodiments of the present invention, there is provided a system for processing files as a preemptive measure against a ransomware activity.

The system comprises a program store storing code and at least one hardware processor coupled to program store for executing the stored code. The code comprising: code instructions for scanning a plurality of file operation requests sent to an operating system (OS) executed on a computing device to detect a guarded file operation request that comprises file processing instructions to process a file managed by a file system used by the OS, code instructions for delaying an execution of the guarded file operation request, code instructions for temporarily storing a copy of the file in a backup storage in response to the detection of the guarded file operation request, and code instructions for stop delaying the execution of the guarded file operation request when the storing is completed.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention, in some embodiments thereof, relates to ransomware and, more specifically, but not exclusively, to methods and systems for remediating the effect of ransomware.

According to some embodiments of the present invention, there are provided systems and methods for preemptively protecting a computing device from losing content of files as an outcome of a ransomware attack without preventing the ransomware attack or using over redundant storage space for backing up the protected files. The systems and methods are based on scanning, for example by hooking or monitoring, the file operation requests which are submitted by processes (e.g. applications) executed on the computing device, for example API calls submitted to the operating system (OS) executed on processor(s) of the computing device.

Optionally, a file operation request considered as guarded file operation request, for instance convey instructions for creating, deleting, and/or modifying a file, is detected by the scanning. This detection leads to a delay in the execution of the guarded file operation request and triggers a temporal storage of a copy of the file which is the subject of the file operation request. The temporal storage is optionally dynamically adapted according to the detection of other guarded file operation requests, for instance according to the frequency or amount of guarded file operation requests which are originated from a common process or related processes in a given period. The methods and systems may be implemented using a code locally executed on the computing device and/or using a code remotely executed on a central server.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
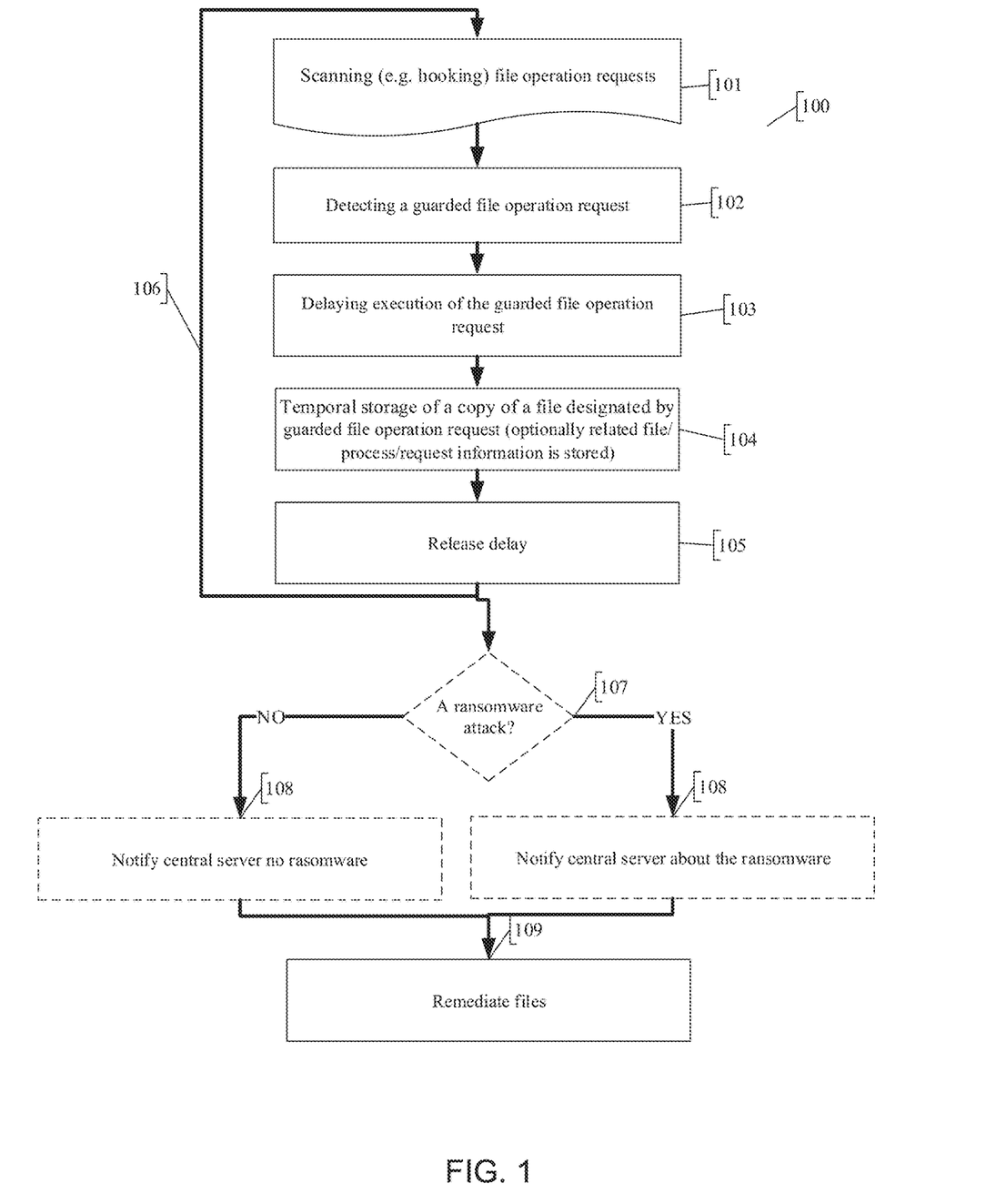
FIG. 1 is a method of runtime preemptive protection of data in response to a detection of file operation requests given to a file system of an operating system (OS) executed on a computing device, according to some embodiments of the present invention.

Reference is now made to FIG. 1, which is a method 100 of runtime preemptive protection of data in response to a detection of file operation requests given to a file system of an operating system (OS) executed on a computing device, according to some embodiments of the present invention. The method 100 is based on scanning of file operation requests, for instance using a driver filter at the kernel mode for monitoring kernel level OS instructions between the OS and hardware resources and/or by hooking Application Program Interface (API) calls received by processes executed on the computing device. The scanned file operation requests are then analyzed as described below to detect guarded file operation requests, for instance instructions for file operations such as create file, delete file, edit file and/or the like.

Figure 2:
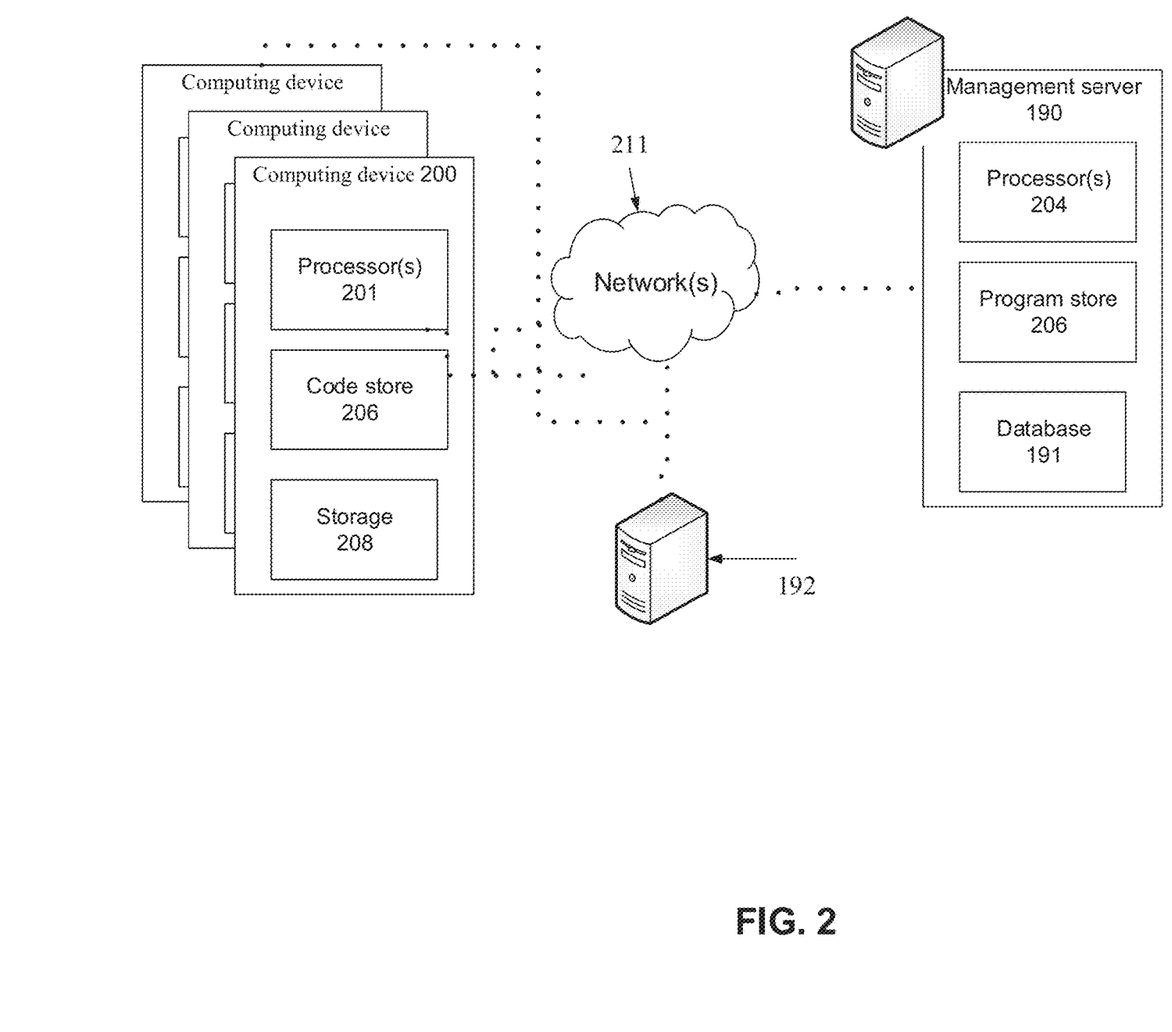
FIG. 2 is a schematic illustration of a computing device having hardware processor(s) which executes instructions for runtime preemptive protection of data in response to a detection of file operation requests, for instance by executing the method of FIG. 1, according to some embodiments of the present invention.

Reference is also made to FIG. 2 which is a schematic illustration of a computing device 200 having hardware processor(s) and an OS that manages a file system, for instance a desktop, a virtual machine, a laptop, a server, a tablet, a Smartphone and/or any network connected computing device. The computing device 200 executes instructions for runtime preemptive protection of data in response to a detection of file operation requests, for instance by executing the method of FIG. 1, according to some embodiments of the present invention. The computing device 200 includes hardware processor(s) 201 and a code store 206, such as a memory for storing a runtime preemptive protection code that includes instructions for runtime preemptive protection. The computing device 200 may include a local storage 208 for backing up copies of files requested by guarded file operation request(s).

The runtime preemptive protection code is optionally executed on the computing device 200. FIG. 1 further depicts a management server 190 for receiving data from the computing device 200 and stores them in a database 191 and optionally to manage remote backup storage 192. The management server 190 may be executed on one or more hardware server(s) and/or virtual machines and may be connected via a network 211 to a plurality of computing device such as 200, each executing runtime preemptive protection processes as described herein.

First, as shown at 101, a plurality of file operation requests sent to the OS executed on the computing device 200 and submitted by process(es) executed on the computing device 200 are scanned. Optionally, file operation requests are API calls submitted by processes of applications executed on the computing device 200. In such embodiments, the scanning may be done by hooking the API calls. The hooking may be done by various processes which intercept function calls or messages or events passed between applications and the OS. The preemptive protection code handles such intercepted function calls, events or messages using a hook element. Additionally or alternatively, the scanning is performed by a filter driver a kernel-mode between the OS and resource components.

This allows, as shown at 102 to detect guarded file operation request(s) among file operation requests. A guarded file operation request is a guarded file operation request that comprises instructions to process specific file(s) managed by the file system used by the OS. Additionally or alternatively, the scanning is performed by a filter driver in a kernel-mode of the OS. When the scanned file operation requests are API calls, the guarded file operation requests may be file access API calls (For example, on Windows based operation systems, NtOpenFile and NtCreateFile API calls in user-mode, file deletion API calls (For example, on Windows based operation systems NtSetInformationFile API call, file modification API calls (For example, on Windows based operation systems, and NtWriteFile API calls. When a file access API call is hooked the following metadata information may be logged a target file type, a desired access to the file (e.g. read, write, delete, execute, etc.).

Optionally, a whitelist of processes is maintained to avoid classifying the file operation requests they submit as guarded file operation requests. The whitelist processes may be detected by identifying a process path, a process hash and/or a process signature. This allows avoiding performance cost added to file operations initiated by legitimate processes such as file change operation or file delete operation documents as part of their objective (i.e. file operations of Windows Explorer process includes legitimate delete operations when a user deletes the whole Documents folder, Linux Shell might delete a lot of documents similarly, Microsoft Excel always edits spreadsheets, etc.).

As shown at 103, the execution of each guarded file operation request by the OS is delayed. The delay is optionally managed by a process derived from the execution of the runtime preemptive protection code by the hardware processor 201.

For example, the file operation requests are transferred via a layer formed between the applications executed by the computing device 200 and the OS executed by the computing device 200. In such a manner each OS call issued by an application is reviewed before being transferred for execution by the OS.

During this delay, as shown at 104, a copy or copies of files designated by the guarded file operation request(s) is temporarily stored in a backup storage in response to the detection of the guarded file operation request(s). The temporal storage is optionally managed by a process derived from the execution of the runtime preemptive protection code by the hardware processor 201. The backup storage may be a local storage of the computing device and/or a network storage resource such as a storage server and/or the like.

Optionally, metadata related to the file is extracted from a resource managed by the OS, for example from the registry. The metadata is optionally logged in association with the copy of the file to allow reconstructing the file and the metadata in a reconstruction stage. The metadata may include bookkeeping information that is associated with the file within a file system. The metadata may include an indication of the length of the data contained in the file, the number of blocks allocated for the file or a byte count, the time that the file was last modified, for instance a timestamp, a file creation time, the time the file was last accessed, the time the metadata was changed, and/or the time the file was last backed up. Other information may include the file's type, an owner user identifier (ID), a group ID, access permissions, a submitting process IP, and/or other file attributes (e.g. whether the file is read-only).

Optionally, when backing up the file and respective metadata a unique identifier of the process that performed the operation(s) and triggers the backup is stored, optionally with a timestamp. In such embodiments, when the process that performed the operation(s) is classified or about to be classified as a ransomware, a graphical user interface asking to validate the legitimacy of operation(s) triggering the backup may be displayed to an end-user and/or a security administrator.

Optionally the user is presented with one or more of the following: List of related files, information regarding potential ransomware process (e.g. including unique identifier), and information indicative of ransomware behavior (e.g. Changes, minute change rate, and/or the like).

In such a manner, reactions to identification of a ransomware may be controlled by the end user or and/or the security administrator. This allows reducing false positive classification of ransomware.

Optionally, information of the process submitting the guarded file operation request(s) is logged, optionally stored in the database 205 and/or locally in the storage of the computing device 200, for instance when executing the preemptive protection code. The logged data is optionally analyzed, for instance by the preemptive protection code or by a central preemptive protection code running on the server 199 to determine whether or not the computing device 200 is currently under a ransomware attack, for instance by evaluating an amount, type, frequency, submitting pattern and/or origin(s) of the guarded file operation request(s). For brevity, the central preemptive protection code and the preemptive protection code may be referred to herein interchangeably.

Optionally, the backup storage assures that there is enough disk storage to maintain files by creating, for instance during initialization, empty database file(s) with a specified size. In such embodiments, whenever storage is requested the pre-conserved space is used for storage without requiring additional disk space consumption (as long as the data size of the files is less or equal to the preconfigured initial space).

Optionally, in order to make sure that the copies of the files which are stored in the storage space are not accessed by a ransomware, guarded file operation requests submitted for accessing these copies are also processed by the preemptive protection code. Optionally, access to the storage space is done only from authorized processes, for instance processes in a whitelist. The access may be prevented by returning a 'fake' ACCESS DENIED response to requesting application instead of transferring the respective file operation request to the OS or to the hardware. Optionally, the file extension of the stored copies is changed to avoid attack by some known ransomwares. For example, the camouflaged file extension is .dat, .exe, .dll and/or no extension.

Now, as shown at 105, after a copy of the file is temporarily stored at the temporal backup space, the delayed and detected guarded file operation request is released to be executed by the operating system.

Optionally, as shown at 106, the storing and the delaying are performed for each of a plurality of detected guarded file operation requests, either sequentially or in parallel. The plurality of detected guarded file operation requests are for a plurality of different files and/or for different versions of the same file.

Optionally, as shown at 107, the guarded file operation request(s) and optionally the stored metadata and data about the processes submitting the guarded file operation request(s) is analyzed to determine whether the computing device 200 is under a ransomware attack. A potential ransomware attack may be identified by the preemptive protection code for instance based on the amount, the type, and/or the frequency of the guarded file operation requests and/or the files accessed by the guarded file operation requests. For example, when guarded file operation requests to modify or delete X documents under Y minutes, a ransomware attack is detected (X may be any number of documents, for example 2, 5, and 10 and Y maybe any number of minutes for example 30, 60, and 120). Optionally, the type or identity of the used process is taken into account.

As indicated above, each one of the files is marked with a unique identifier of the process that performed the operation(s) and optionally with information regarding the ransomware process and triggers the backup thereof. In use, this allows to identify the files accessed by the process performing the attack and to perform one or more remediation operations thereon. For example, all the files that include the unique identifier of the process and respective metadata may be restored. This may be performed in addition to the termination of the process.

Additionally or alternatively other factors may be taken into account, for example the time of the day, the type and usage of the computing device 200, (e.g. workstation classification), the credentials of user(s) logged on to the computing device 200, the log in history of the computing device 200, and/or the like.

A Ransomware typically targets specific file extensions (i.e. documents like picture files, office documents, movies, etc.). These types may also be an indication of an attack.

Optionally, loading of encryption libraries by a process is detected, for instance crypt32 and openssl Libraries. This may be used for classifying the process as a ransomware. Additionally or alternatively, the memory of a process is scanned to detect predefined crypt related code sections for classification of a process as a ransomware.

In use, when a file modification request is identified, for example as describe above, loaded modules in a process that generated the file operation request may be scanned to detect loading of encryption libraries (i.e. crypt32.dll, openssl, GnuPG, etc.). The process is marked as a probable ransomware by the preemptive protection code and the file operation (optionally as future file operations generated by the process) is denied. Optionally, the process is terminated as well as a notification is sent to the central server 199.

Additionally or alternatively, a process is classified as a ransomware when its behavior pattern matches a suspicious file processing behavior pattern. A suspicious file processing behavior pattern may be of a process that modifies a header of a document (e.g. Office Word document) while the content of the document changes and/or of a process storing a file with a changed header.

Optionally, as shown at 108, a notice about a presence or said absence of a ransomware is forwarded to the central server 199, for instance based on the estimation of a presence or absence of a ransomware that is done as described above.

When a potential ransomware attack is locally identified a notification may be sent to the central preemptive protection code running on the central server 199. This notification may later induce a restoration process and/or providing a user with a tool for storage management actions. Optionally, the notice includes a report indicating remediation operations including names of backed up files and/or respective metadata and optionally retrieval information.

As shown at 109, the central preemptive protection code running on the central server 199 or the preemptive protection code can now instruct remediation of the backed up files, optionally using the stored metadata. The remediation may be based on time and/or classification of the respective process as a ransomware or not a ransomware. Optionally, the preemptive protection code or the central preemptive protection code instructs presenting a graphical user interface (GUI) to a user for receiving therefrom user inputs indicative of whether to restore attacked files or not.

After restoring the files and the respective metadata, the data about files may be stored for future restoration or be deleted from the in backup storage in order to maintain backup space for future files.

Optionally, a log documenting which files or folders have been attacked is maintained and later used for estimating a new ransomware attack (e.g. when a file was previous attack each guarded file operation request(s) for is considered more suspicious than guarded file operation request(s) for other files or folders). The log allows identifying potential ransomware attacks and generates alerts accordingly.

Optionally, request information regarding each of the detected guarded file operation requests is stored in a log. For instance, an origin process, a time of detection, the instruction type and/or classification and/or the like are logged per detected guarded file operation request.

Optionally, the storage period of each file is dynamically updated according to an evaluation of a risk from the process submitted the respective guarded file operation request. The risk is determined based on an estimation of whether the process submitting the guarded file operation request is a ransomware or triggered by a ransomware. For example, the file is stored to a period which is a function of a number and/or frequency of detected guarded file operation requests from the same process or from a set of connected or related processes. For instance, when the process submitted one guarded file operation request in the last 30 minutes, the requested file (and optionally the respective metadata) is stored for 30 minutes. When the process submitted more than one guarded file operation request during a period of 30 minutes, the requested file (and optionally the respective metadata) is stored for as a function of the number of guarded file operation requests, for example additional 30 minutes for each detected guarded file operation request from a common process within a monitoring period.

Optionally, the storage period of each file is dynamically updated according to pattern characteristic(s) of a pattern of submitting a plurality of guarded file operation requests from the same process or from a set of connected or related processes. The pattern characteristic may be an access to files based on an alphabetic order, an access to files based on a file creation time order, an access to files based on folder names and/or any other pattern which known Ransomwares access files.

Optionally, the files remains in storage as long as there is enough storage space in the backup storage allocated for storing files associated with guarded file operation requests. In such embodiment a file may be deleted according a backup date, for instance a timestamp of the stored file, for instance based on a first in first out management scheme that may be managed based on data from the logs. For example, when there is not enough space to store a file, the oldest file which is optionally stored for at least predefined period (e.g. a configurable value and/or a defined period such as 5, 10, 15, 30, and 60 minutes, an hour, a day, a week, and/or any intermediate or longer period) is deleted or forwarded to a long term storage for freeing space. When there is still not enough space the next oldest file(s) can be deleted.

In one example, a backup storage is initialized with a size of 10 megabyte (MB). The backup storage is instructed to store copies of file A and file B by the preemptive protection code where file A and its metadata requires 5 MB and where file B and its metadata requires 3 MB. When a copy of file C having a size of 3 MB is sent for backup by the preemptive protection code the timestamp of the copies of files A and B is checked and also whether 60 minutes have passed since the backup timing (in this example 60 minutes is a configured minimum lifespan). The oldest of files A and B which is also stored for more than 60 minutes is deleted from the storage and file C is stored. This means that the database will now have 4 MB of free storage left.

Optionally, the files are compressed before being stored. Optionally, the storage is done with a timestamp indicative of a storage point in time to enable keeping multiple versions of the same files stored. Since a specific file might be modified multiple times by different processes the ability to store different versions of the same file allows backing up each of the changes without overwriting old stored data. This also solves assures that if a ransomware tries to camouflage its activity by performing the encryption after a decoy action such as changing the file name or adding content thereto (e.g. '0' or '1'), a copy of the amended file is still stored.

Additionally or alternatively, the storage space is expanded when not enough storage space is found in the backup storage for storing the file(s). The expending is optionally done by adding storage space in a network storage resource. For example, the central server 199 may add storage for a file when needed.

Additionally or alternatively, when the storage space cannot allocate space for the file, the respective guarded file operation request is not executed and a notification may be presented to the user of the computing device 200 and/or sent to an administrator. For example, the process is prevented by the preemptive protection code from modifying and or deleting the file, for example for returning a 'fake' ACCESS DENIED response to the process instead of transferring the file operation request to the OS or to the hardware resource.

Figure 3:
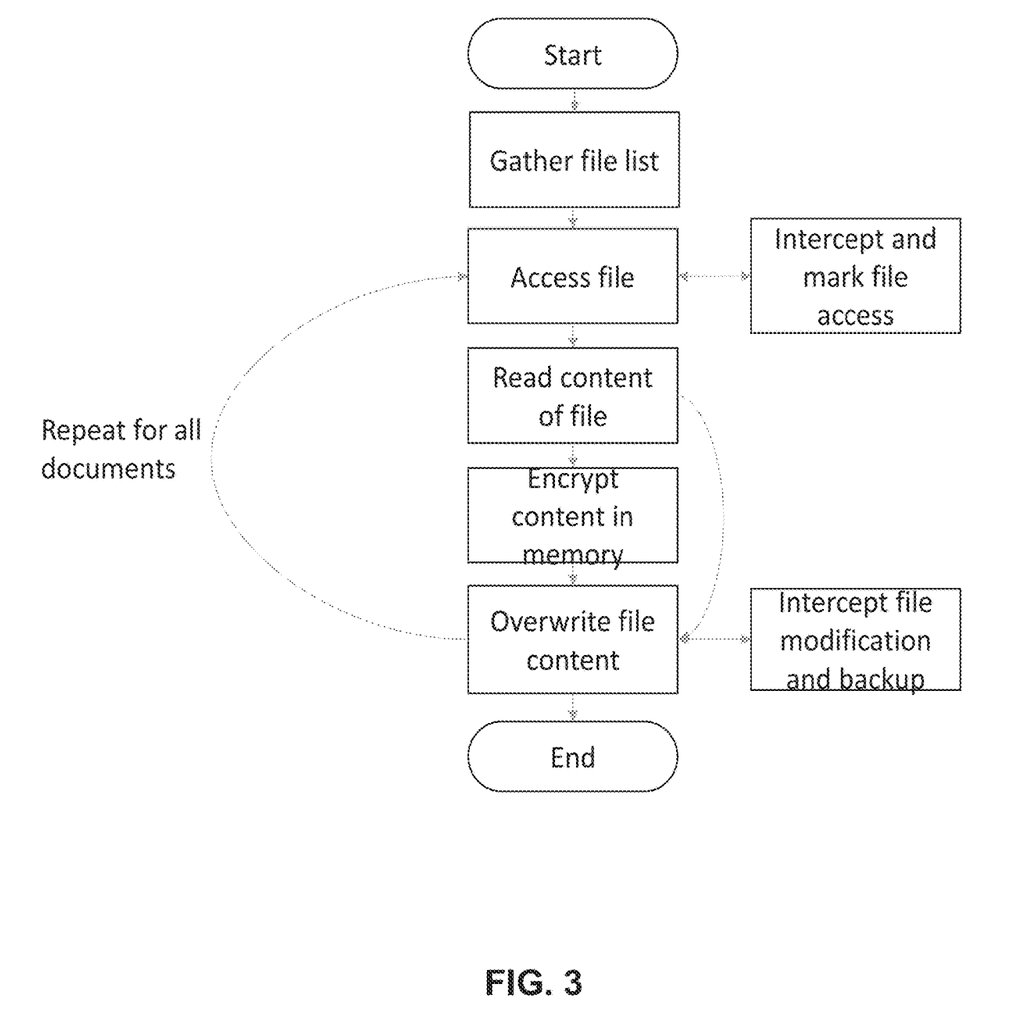
FIGS. 3-4 are flowcharts depicting actions of a ransomware during a ransomware attack.

Reference is now made to flowcharts depicting actions of a ransomware during a ransomware attack. FIG. 3 is a flowchart depicting actions of a Ransomware that uses overwrite instructions. During an attack, the ransomware gathers a list of files to encrypt, typically office related documents, picture files, movie files, text files, and/or the like. The Ransomware may search for documents for example by looking for a specific set of file extensions or by iterating through all files and checking their content format. Instead of first gathering the list of files and then iterate them, a ransomware might also search relevant files and encrypt each of them when stumbled. For each file detected as a target document, the ransomware uses operation system based API function to access the file (i.e. NtOpenFile, NtCreateFile, CreateFile, OpenFile, fopen, etc.) and generates Read and Write instructions using API calls for requesting overwriting by writing the encrypted version of the document.

In runtime, the preemptive protection code intercepts the API calls as they are identified as guarded file operation requests. The characteristics of the API calls and/or the process and/or the requested file are analyzed to estimate a ransomware attack, for instance a file type a file format. Optionally, when a ransomware attack is estimated, other API calls from the process are intercepted and delayed and respective files are sent for storage. In response to a read/access operation a token, such as a handle is provided to the ransomware (when modifying a file using the OS, API calls like Windows or Linux API calls are responded with a handle prior to file access operation/API call).

Now, the ransomware reads the content of the document in order to encrypt it. The ransomware might read one block from the document, and then immediately overwrite it with an encrypted version thereof or read the whole content of the file, encrypt it while still in the memory and then overwrite the document content. When the ransomware performs the first file modification operation (i.e. WriteFile, NtWriteFile, write, etc.) to that document, the respective API call is intercepted as described above and optionally a notification is forwarded to the central server 199.

When the handle provided by the API call is identified in a following file operation request, the file operation request is marked for interception and the requested file and optionally the metadata thereof are stored as described above. Future transactions for the same file will be handled similarly. The delayed API call is forwarded to the OS.

Figure 4:
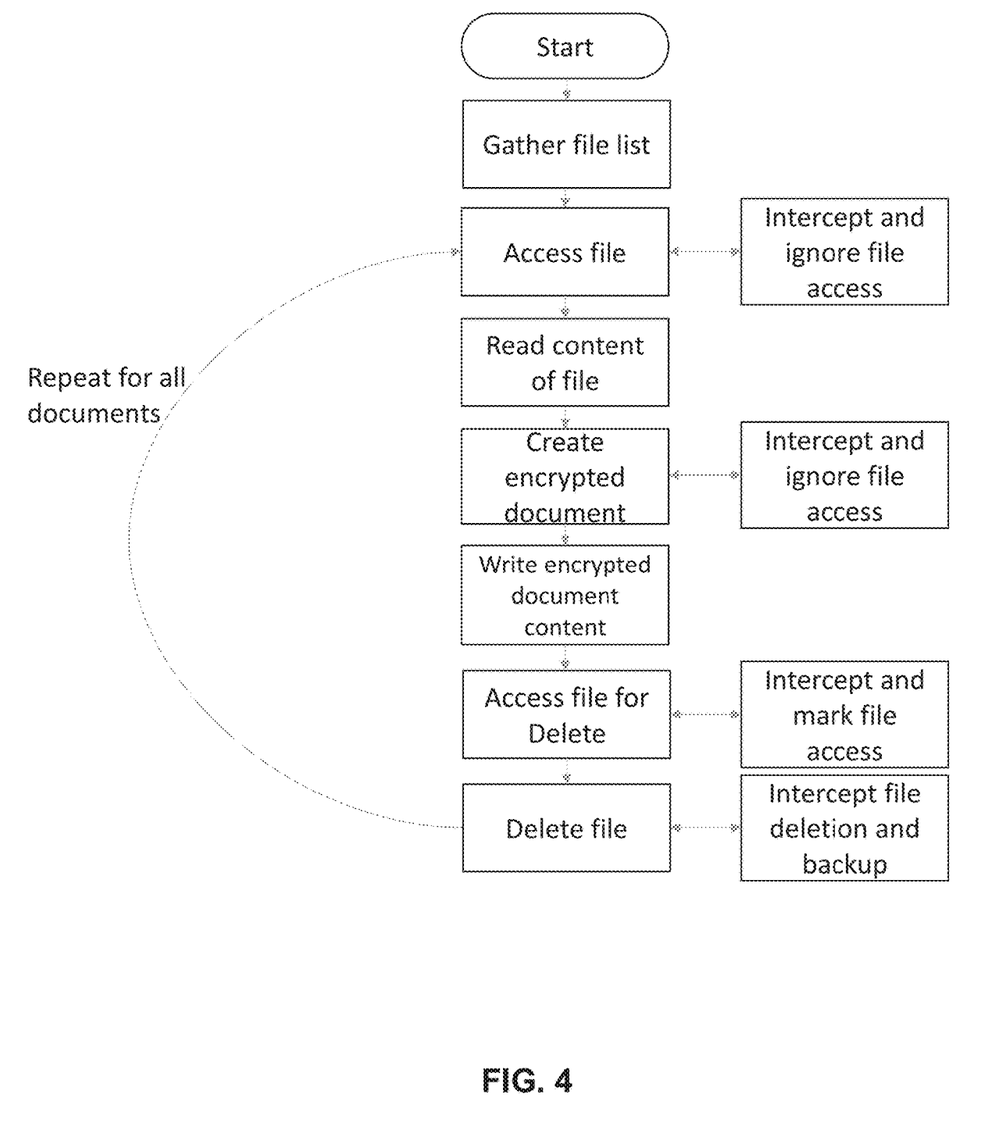

Reference is now made to FIG. 4 which a flowchart that depicts actions of a Ransomware that creates new encrypted files and deletes the original files. In this modus operandi the ransomware is accessing a file only for reading as it is not about to overwrite it or even delete it yet. Such a file operation request is intercepted and not identified as a guarded file operation request. The ransomware requests a creation of a new file for holding an encrypted content of the file. This request is also not identified as a guarded file operation request as it is an operation for a creation of a new file. The ransomware now submits a request for deleting the file. The respective API call (NtSetInformationFile, DeleteFile, delete, and/or the like) is intercepted and identified as a guarded file operation request. This leads to a deletion delay and for storage in the backup storage as described above.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant methods and systems will be developed and the scope of the term a processor, a computing device, a network and a server is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computerized method for processing files as a pre-emptive measure against ransomware that performs encryption after a decoy action to camouflage a ransomware activity, comprising:
   scanning a plurality of file operation requests sent to an operating system (OS) executed on a computing device to detect a guarded file operation request that comprises instructions to process a file managed by a file system used by said OS,
   wherein the guarded file operation is selected from the group consisting of: renaming, creating, deleting, and modifying the file;
   delaying an execution of said guarded file operation request;
   temporarily storing a copy of said file and a timestamp indicative of a storage time of said file in a backup storage in response to said detection of said guarded file operation request;
   backing up a plurality of versions of said file in said backup storage, wherein each respective version of the plurality of versions of said file is associated with a unique said timestamp indicative of said storage time of said respective version,
   wherein said plurality of versions capture a plurality of changes to said file including a decoy action performed by a ransomware that performs encryption after the decoy action to camouflage ransomware activity,
   wherein said plurality of versions of said file that are backed up are created in response to a plurality of modifications of the same file by a plurality of different processes; and
   stop delaying said execution of said guarded file operation request when said copy is stored in said backup storage.

2. The computerized method of claim 1, wherein each one of said plurality of versions of said file is stored for a storage period of time according to a respective of said timestamp, said storage period of time of said copy is dynamically updated according to an evaluation of a risk from at least one process submitting said guarded file operation request.

3. The computerized method of claim 2, further comprising scanning a plurality of additional file operation requests sent to said OS to detect a plurality of additional guarded file operation requests each of the plurality of additional file operation requests comprises file processing instructions to process a plurality of other files managed by said file system;
   wherein said risk is determined according to an analysis of at least one characteristic of said plurality of additional guarded file operation requests.

4. The computerized method of claim 1, wherein said plurality of file operation requests are Application Program Interface (API) calls captured by hooking.

5. The computerized method of claim 4, wherein said guarded file operation request is selected from a group consisting of: a NtSetInformationFile call, a DeleteFile call, a NtOpenFile call, a NtCreateFile call, and a ntWriteFile.

6. The computerized method of claim 1, wherein said scanning is performed by a filter driver in kernel-mode of said OS.

7. The computerized method of claim 1, further comprising when a process submitting said guarded file operation request is classified as a ransomware activity, presenting to a user a graphical user interface, and performing a remediation activity based on an input received via said graphical user interface.

8. The computerized method of claim 1, further comprising classifying a process submitting said guarded file operation request based on an analysis of a sequence that combines said guarded file operation request and a plurality of file operation requests previously submitted by said process to said OS during a predefined period.

9. The computerized method of claim 1, further comprising classifying a process submitting said guarded file operation request based on an analysis of a memory of said process to detect a presence or an absence of at least one predefined crypt related code section.

10. The computerized method of claim 1, further comprising classifying a process submitting said guarded file operation request based on an analysis of a file processing behavior pattern.

11. The computerized method of claim 1, wherein said storing comprises:
   extracting metadata related to said file from a resource managed by said OS; and
   logging said metadata.

12. The computerized method of claim 1, wherein said storing comprises:
   identifying when not enough a storage space is found in said backup storage for storing said file;
   deleting at least one backed up copy stored in said backup storage according a backup date.

13. The computerized method of claim 1, wherein said storing comprises:
   identifying when not enough a storage space is found in said backup storage for storing said file;
   expending said backup storage using at least one network storage resource.

14. The computerized method of claim 1, wherein said storing comprises:
   identifying said plurality of previously backed up versions of said file in said backup storage;
   using said timestamp for selecting which of said plurality of previously backed up versions to delete in order to release storage space in said backup storage.

15. The computerized method of claim 1, wherein said storing comprises:
   identifying when not enough a storage space is found in said backup storage for storing said file;
   preventing an execution of said guarded file operation request by said OS; and
   generating a notification indicative of said prevented execution of said guarded operation request for presentation on a display.

16. The computerized method of claim 1, wherein said backup storage is a remote storage accessed by said computing device via a network.

17. The computerized method of claim 1, further comprising scanning a plurality of additional file operation requests sent to said OS to detect a plurality of additional guarded file operation requests each comprises file processing instructions to process a plurality of other files managed by said file system;

calculating a frequency or an amount of said plurality of additional guarded file operation requests; and determining a presence or an absence of a ransomware activity according to said frequency or said amount.

18. A system for processing files as a preemptive measure against a ransomware that performs encryption after a decoy action to camouflage ransomware activity, comprising:

a program store storing code; and at least one hardware processor coupled to program store for executing the stored code, the code comprising:

code instructions for scanning a plurality of file operation requests sent to an operating system (OS) executed on a computing device to detect a guarded file operation request that comprises file processing instructions to process a file managed by a file system used by said OS, wherein the guarded file operation is selected from the group consisting of: renaming, creating, deleting, and modifying the file;

code instructions for delaying an execution of said guarded file operation request;

code instructions for temporarily storing a copy of said file and a timestamp indicative of a storage time of said file in a backup storage in response to said detection of said guarded file operation request;

code instructions for backing up a plurality of versions of said file in said backup storage, wherein each respective version of the plurality of versions of said file is associated with a unique said timestamp indicative of said storage time of said respective version, wherein said plurality of versions capture a plurality of changes to said file including a decoy action performed by a ransomware that performs encryption after the decoy action to camouflage ransomware activity, wherein said plurality of versions of said file that are backed up are created in response to a plurality of modifications of the same file by a plurality of different processes; and code instructions for stop delaying said execution of said guarded file operation request when said storing is completed.

19. The computerized method of claim 1, wherein said storing comprises:

identifying when not enough storage space is found in said backup storage for storing said file; and deleting at least one backed up copy stored in said backup storage when said at least one backed up copy is determined as being stored for at least a predefined period according to said timestamp indicative of said storage time of said at least one backed up copy.

20. A computer program product for processing files as a preemptive measure against ransomware that performs encryption after a decoy action to camouflage a ransomware activity, comprising:

a non-transitory memory having stored thereon a code for execution by at least one hardware processor of a computing device, the code comprising:

instructions for scanning a plurality of file operation requests sent to an operating system (OS) executed on a computing device to detect a guarded file operation request that comprises instructions to process a file managed by a file system used by said OS, wherein the guarded file operation is selected from the group consisting of: renaming, creating, deleting, and modifying the file;

instructions for delaying an execution of said guarded file operation request;

instructions temporarily storing a copy of said file and a timestamp indicative of a storage time of said file in a backup storage in response to said detection of said guarded file operation request;

instructions for backing up a plurality of versions of said file in said backup storage, wherein each respective version of the plurality of versions of said file is associated with a unique said timestamp indicative of said storage time of said respective version, wherein said plurality of versions capture a plurality of changes to said file including a decoy action performed by a ransomware that performs encryption after the decoy action to camouflage ransomware activity, wherein said plurality of versions of said file that are backed up are created in response to a plurality of modifications of the same file by a plurality of different processes; and instructions for stop delaying said execution of said guarded file operation request when said copy is stored in said backup storage.

21. The computerized method of claim 1, wherein the plurality of versions of said file are backed up in said backup storage without overwriting older versions of said file.

22. The computerized method of claim 1, further comprising remediating a certain version of the file from the plurality of versions that were backed up prior to the decoy action performed by the ransomware.

23. The computerized method of claim 1, wherein the decoy action comprises changing a name of the file, wherein the plurality of versions capture an original name of the file and the changed name of the file.

24. The computerized method of claim 1, wherein the decoy action comprises changing a content of the file, wherein the plurality of versions capture a original content of the file prior to the changing of the content of the file.

* * * * *